Aug. 7, 1928.
S. SMITH
1,679,690
BRAKE GEAR FOR MOTOR VEHICLES
Filed May 19, 1927
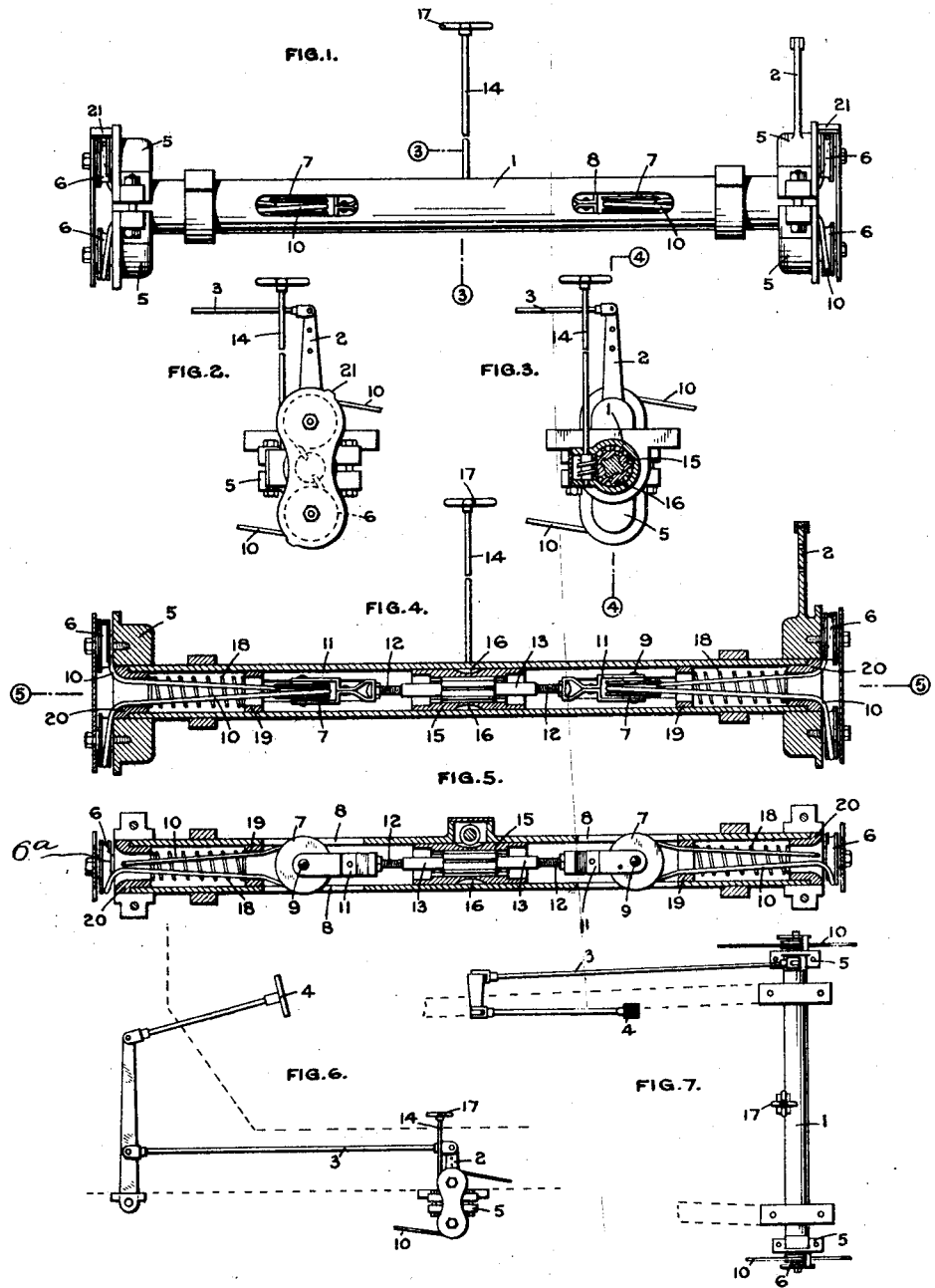

Patented Aug. 7, 1928.

1,679,690

UNITED STATES PATENT OFFICE.

SYDNEY SMITH, OF CHOBHAM, ENGLAND, ASSIGNOR OF ONE-HALF TO SELWYN FRANCIS EDGE, OF THAMES DITTON, ENGLAND.

BRAKE GEAR FOR MOTOR VEHICLES.

Application filed May 19, 1927, Serial No. 192,720, and in Great Britain June 3, 1926.

The present invention relates to brake gear for motor vehicles, and has particular reference to four wheel brake gear. The primary object of the invention is to provide an improved construction of gear giving more efficient action and adjustment of the brakes than heretofore. To this end in the improved gear the brake pedal or hand lever effort is distributed to all four brakes through a single shaft, whilst all the brakes are compensated collectively. Preferably this is done by compensating the brakes on the same side of the vehicle against one another and then compensating the two side sets of brakes against one another.

In carrying out this part of the invention the brakes may be operated by means of cables passing over suitable fair leads and pulleys to an easily accessible central part, where they are housed in a tube, rotation of which causes application of the brakes.

According to a further part of the invention, the brakes are adapted to be all four adjusted by means of a single adjustment device, preferably located in a position easily accessible from the driver's seat, the individual brakes adjusting themselves automatically by virtue of the compensating arrangement. Preferably this is accomplished by providing the adjustment in the compensating means between the two side sets of brakes.

Referring to the drawings:—

Figure 1 is a rear elevation of an operating shaft for four wheel brakes according to the invention.

Figure 2 is a side view.

Figure 3 is a sectional side view taken on line 3—3 of Figure 1.

Figure 4 is a sectional view taken on line 4—4 of Figure 3.

Figure 5 is a sectional plan view taken on line 5—5 of Figure 4.

Figure 6 is a side elevation showing the general layout of the brake gear on a vehicle, and Figure 7 is a plan view of the brake gear corresponding to Figure 2.

Referring to the drawings, the four brakes are simultaneously operated by means of a tubular transverse shaft 1 provided with an arm 2 adapted to be rotated through a rod or cable 3 by the brake pedal or lever 4, in the following manner. At each end of the tubular shaft 1 are provided mountings 5 for pairs of pulleys or leads 6 disposed diametrically, and longitudinally on both sides of the centre of the shaft are provided a pair of pulleys 7 slidable in longitudinal slots 8 in the tubular shaft 1. These pulleys 7 are rotatable on pivots 9 rigidly connected together within the tubular shaft 1. The brakes on each side of the vehicle are operated by a cable 10 passing from the rear brake partially round one of the pulleys or leads 6 on the corresponding end of the tubular shaft 1, into the end of the shaft, round the nearest pulley 7 slidable along the shaft, and back out of the same end of the tubular shaft, partially round the other pulley or lead 6 on the end thereof and thence to the front brake.

By reason of the foregoing construction, the four brakes will be operated simultaneously by rotating the tubular shaft 1 in such a direction as to tighten the cables 10 leading to the respective brakes, whilst owing to the fact that the front and rear brakes are operated by the same cable 10 passing freely over pulleys or leads 6 and 7, they will automatically compensate each other, and owing to the fact that the two cables 10 are linked together internally of the tube 1 by rigidly connected but freely slidable pulleys 7, the two cables 10 will automatically compensate each other.

In order to carry the second part of the invention into effect, provision is made for adjusting the spacing between the two pulleys 7 slidable along the tubular shaft 1 and associated with the two side brake cables 10 respectively. To this end, as shown, the two pulleys 7 are mounted between the arms of U-shaped members 11 provided at their bends with projecting right and left handed screws 12 adapted to engage in a correspondingly screw threaded sleeve or turn buckle 13. To rotate this sleeve 13 same may be provided externally with a longitudinal rib or key, and surrounded by a correspondingly internally shaped ring or sleeve 15 having external worm teeth 16 adapted to mesh with a worm fitted transversely in the brake shaft 1. This worm is provided with a sufficiently long shaft 14 to extend into a position in which a knob 17, or the like, thereon may be easily operated from the driver's seat, the transverse operating shaft 1 being located as close as possible beneath the driver's seat, so that the adjustment shaft 14 is as short as possible. By rotation of said worm shaft 14 the sleeve 13 may be rotated within the tubular brake shaft 1 so as to move the screws 12 connected to the pulley mountings 11 inwardly or outwardly, thereby moving the pulleys 7 closer together or further apart, and thus tightening or slackening all four brakes equally, the sleeve 13 being free to take up any longitudinal position of equilibrium in the brake shaft 1, in which position the pull on the two brake cables 10 will be equal.

Owing to the difficulty of making a wire cable take sharp bends such as are necessary in passing round the two slidable pulleys 7, the two cables 10 preferably pass from the fixed pulleys 6 to the slidable pulley 7 and back again through coil springs 18 disposed in the tubular shaft 1 between internal fixed collars 19 in shaft 1 and brass bushes 20 fixed in the ends of the shaft 1, said brass bushes 20 having curved or flared mouths so as to reduce as much as possible the sharpness of the bends in the cables 10 on entering and leaving the ends of the shaft 1. The fixed pulleys 6 have their inner flanges cut away for a suitable length at 6ª to allow the cables to pass therefrom into the tubular shaft 1. To assist in holding the cables 10 to the pulleys 6, a suitable number of arch members 21 are provided extending over the pulley grooves between the inner and outer side plates of the pulley mountings 5.

The invention is not limited to the construction herein specifically described and illustrated or to the details thereof, as other constructions may be devised to embody the invention.

What I claim then is:—

1. Brake gear comprising a single operating shaft, a plurality of cables, each cable being adapted to operate a pair of brakes, said brakes being compensated against each other in pairs and collectively, means on said operating shaft adapted to vary the effective length of the said cables, means for compensating said cables against each other comprising a member common to all of said cables and slidable longitudinally of said operating shaft and with which each of the said cables is associated.

2. Brake gear comprising a single operating shaft, a plurality of cables, each cable being adapted to operate a pair of brakes, said brakes being compensated against each other in pairs and collectively, means on said operating shaft adapted to vary the effective length of the said cables, means for compensating said cables against each other comprising a member common to said cables, said common member being carried by a rotatable and non-slidable adjusting member carried by the operating shaft, and means for rotating said adjusting member relative to the operating shaft.

3. Brake gear comprising a single operating shaft, a plurality of cables, each cable being adapted to operate a pair of brakes, said brakes being compensated against each other in pairs and collectively, means on said operating shaft adapted to vary the effective length of the said cables, means for compensating said cables against each other comprising a member common to all of said cables and slidable longitudinally of said operating shaft and with which each of the said cables is associated, said common member being carried by a rotatable and non-slidable adjusting member carried by the operating shaft, said common member being adjustably connected to the pulleys over each of which one of the said cables is adapted to pass, said pulleys being adjusted to or from each other on rotation of, and slidable relative to the operating shaft with, the said common member, and means for rotating said adjusting member relative to the operating shaft.

4. Four wheel brake gear wherein the effort for all four brakes is distributed through a single shaft, and means for compensating all the brakes collectively, comprising a rotatable tubular shaft, bearings for said shaft, diametrical arms on the ends of said shaft, pulleys oppositely disposed on said arms, continuous cables each adapted to operate the brakes on the corresponding sides of the vehicle and passing over said pulleys, means for compensating said cables against each other consisting of a member common to all the cables and movable longitudinally in the tubular operating shaft and adjustable in length, pulleys mounted at the ends of said member, said cables passing in through the ends of said shaft between said oppositely disposed pulleys and over said pulleys carried by said common member.

5. Four wheel brake gear wherein the effort for all four brakes is distributed through a single shaft, and means for compensating all the brakes collectively, comprising a rotatable tubular shaft, bearings for said shaft, diametrical arms on the ends of said shaft, pulleys oppositely disposed on said arms, continuous cables each adapted to operate the brakes on the corresponding sides of the vehicle and passing over said pulleys, means for compensating said cables against each other consisting of a member common to all the cables and movable longitudinally in the tubular operating shaft, said member comprising a tubular sleeve provided with right and left hand screw connections with guided rods, pulleys carried at the outer ends of said rods, and means for rotating said sleeve.

6. Four wheel brake gear wherein the effort for all four brakes is distributed through a single shaft, and means for compensating all the brakes collectively, comprising a rotatable tubular shaft, bearings for said shaft, diametrical arms on the ends of said shaft, pulleys oppositely disposed on said arms, continuous cables each adapted to operate the brakes on the corresponding sides of the vehicle and passing over said pulleys, means for compensating said cables against each other consisting of a splined member common to all cables and movable longitudinally in a sleeve rotatable in the tubular operating shaft, said common member being provided with right and left hand screw connections with guided rods, pulleys carried at the outer ends of said rods, gear mechanism adapted to rotate said sleeve in said tubular shaft, an adjustment rod, and an operating member adapted to actuate said gear mechanism.

7. Brake gear having means for distributing the effort for all the brakes through a single shaft, and means for compensating all the brakes collectively, comprising a rotatable tubular shaft, bearings for said shaft, diametrical arms on the ends of said shaft, pulleys oppositely disposed on said arms, continuous cables each adapted to operate the brakes on the corresponding sides of the vehicle and passing over said pulleys, and means for compensating said cables against each other consisting of a member common to all the cables and movable longitudinally in the tubular operating shaft and adjustable in length, pulleys mounted at the ends of said member, said cables passing in through the ends of said shaft between said oppositely disposed pulleys and over said pulleys, the portions of said cables between the pulleys oppositely disposed on the ends of the tubular shaft and the pulleys on said common member being arranged to pass through coiled springs.

8. Four wheel brake gear wherein the effort for all four brakes is distributed through a single shaft, means for compensating the brakes against each other in pairs, and means whereby the pairs in turn are compensated against each other, comprising a rotatable tubular shaft, bearings for said shaft, an arm on said shaft connected with operating means, diametrical arms on the ends of said shaft, pulleys oppositely disposed on said arms, continuous cables each adapted to operate the brakes on the corresponding sides of the vehicle and passing over said pulleys, said cables being attached at their ends to the brake mechanism of the wheels of the vehicle, means for rotating said tubular shaft whereby the effective length of said cables is shortened or lengthened, a member common to all the cables and movable longitudinally, but not rotatable, in a sleeve rotatably mounted in the tubular operating shaft, said common member being provided with right and left hand screw connections with rods disposed at opposite ends of it, pulleys carried at the outer ends of said rods, gear mechanism adapted to rotate said sleeve in said tubular shaft, an adjustment rod, and an operating member adapted to actuate said gear mechanism, the portions of said cables between the pulleys oppositely disposed on the ends of the tubular shaft and the pulleys on said common member being arranged to pass through coiled springs, and flared bushes in the ends of said tubular shaft.

In witness whereof I affix my signature.

SYDNEY SMITH.